(12) United States Patent
Truong et al.

(10) Patent No.: US 7,177,919 B1
(45) Date of Patent: Feb. 13, 2007

(54) METHOD AND SYSTEM FOR CONTROLLING TASKS ON NETWORK CARDS

(75) Inventors: Alex Truong, Santa Clara, CA (US); Michael Giertych, El Dorado Hills, CA (US); Jan Medved, Pleasanton, CA (US); Mcv Subramaniam, Sunnyvale, CA (US); Phong-Son Le, San Jose, CA (US); Stephen Maruyama, Aptos, CA (US)

(73) Assignee: Cisco Technology, Inc., San Jose, CA (US)

( * ) Notice: Subject to any disclaimer, the term of this patent is extended or adjusted under 35 U.S.C. 154(b) by 701 days.

(21) Appl. No.: 09/724,629

(22) Filed: Nov. 28, 2000

(51) Int. Cl.
G06F 15/177 (2006.01)
G06F 11/00 (2006.01)

(52) U.S. Cl. .......................... 709/220; 714/4

(58) Field of Classification Search .............. 709/223, 709/224, 220, 250, 221; 714/15, 48–51, 714/4, 5
See application file for complete search history.

(56) References Cited

U.S. PATENT DOCUMENTS

| | | | | |
|---|---|---|---|---|
| 6,005,841 A * | 12/1999 | Kicklighter | ............... | 370/217 |
| 6,108,300 A * | 8/2000 | Coile et al. | ............... | 370/217 |
| 6,363,423 B1 * | 3/2002 | Chiles et al. | ............... | 709/224 |
| 6,457,056 B1 * | 9/2002 | Choi | ............... | 709/230 |
| 6,647,428 B1 * | 11/2003 | Bannai et al. | ............... | 709/245 |
| 6,650,640 B1 * | 11/2003 | Muller et al. | ............... | 370/392 |
| 6,694,450 B1 * | 2/2004 | Kidder et al. | ............... | 714/15 |
| 6,715,099 B1 * | 3/2004 | Smith | ............... | 714/4 |
| 6,742,134 B1 * | 5/2004 | Pothier et al. | ............... | 714/4 |

* cited by examiner

*Primary Examiner*—Glenton B. Burgess
*Assistant Examiner*—Sean Reilly
(74) *Attorney, Agent, or Firm*—Blakely, Sokoloff, Taylor & Zafman LLP

(57) ABSTRACT

A method and system for controlling tasks performed on network cards is disclosed. In one embodiment, the method disclosed controls applications that are executed within the network. The method of controlling the applications comprises transition.

23 Claims, 7 Drawing Sheets

Standby-Active Gracefull Switchover

Active-Standby Graceful Switchover

Standby-Active Graceful Switchover

Active Standby Upgrade Switchover

METHOD AND SYSTEM FOR CONTROLLING TASKS ON NETWORK CARDS

FIELD OF THE INVENTION

The present invention pertains to communications and networking. More particularly, the invention relates to the usage of resources in networking devices.

BACKGROUND OF THE INVENTION

Wide area switches for data communications such as asynchronous transfer mode (ATM) packets and Internet Protocol ("IP") data packets can hold numerous modular cards. Switches include controller cards which allow and direct different functions in the Switch. In a redundant configuration, a controller card is active while a second controller card stands-by should the active one fail. The controller cards may be a processor switch module or line cards. Specifically, the controller card coordinates switch-wide operations such as the sequencing of the initialization of a node. Again in a redundant system, an active card line card is backed up by a standby line card. Line cards may be an ATM switching module.

Controller cards execute multiple tasks that may include initializing databases, setting up communication end-points, and configuration methods for users. These tasks may be executed each time certain system operations are performed. Examples of system operations may include when a system is brought up, when an active to standby card switchover or standby to active card switchover occurs, or when software is upgraded on a controller card.

However, prior systems performed the system operations inconsistently. For example, each card in a switch may execute the tasks required for an active to standby card switchover in a different sequence. These prior systems may not achieve high reliability or availability. Nor would prior systems properly and efficiently manage faults in the system. Furthermore, prior systems failed to facilitate system development and integration where multiple groups of engineers work on the same complex system.

SUMMARY OF THE INVENTION

What is disclosed is a method and system for controlling tasks performed on network cards. In one embodiment, the method disclosed controls applications that are executed within the network. The method of controlling the applications comprises transitioning each of the applications between one of a plurality of active states and one of a plurality of standby states.

Other features and advantages of the present invention will be apparent from the accompanying drawings and from the detailed description that follows below.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and system for controlling network cards is disclosed. As described in detail below, in one embodiment of the present invention a switch with redundant network cards includes a central processing unit (CPU) subsystem for controlling the state of applications (or tasks) running on the switch. Applications may include graceful switchovers and initialization of nodes.

Figure 1:
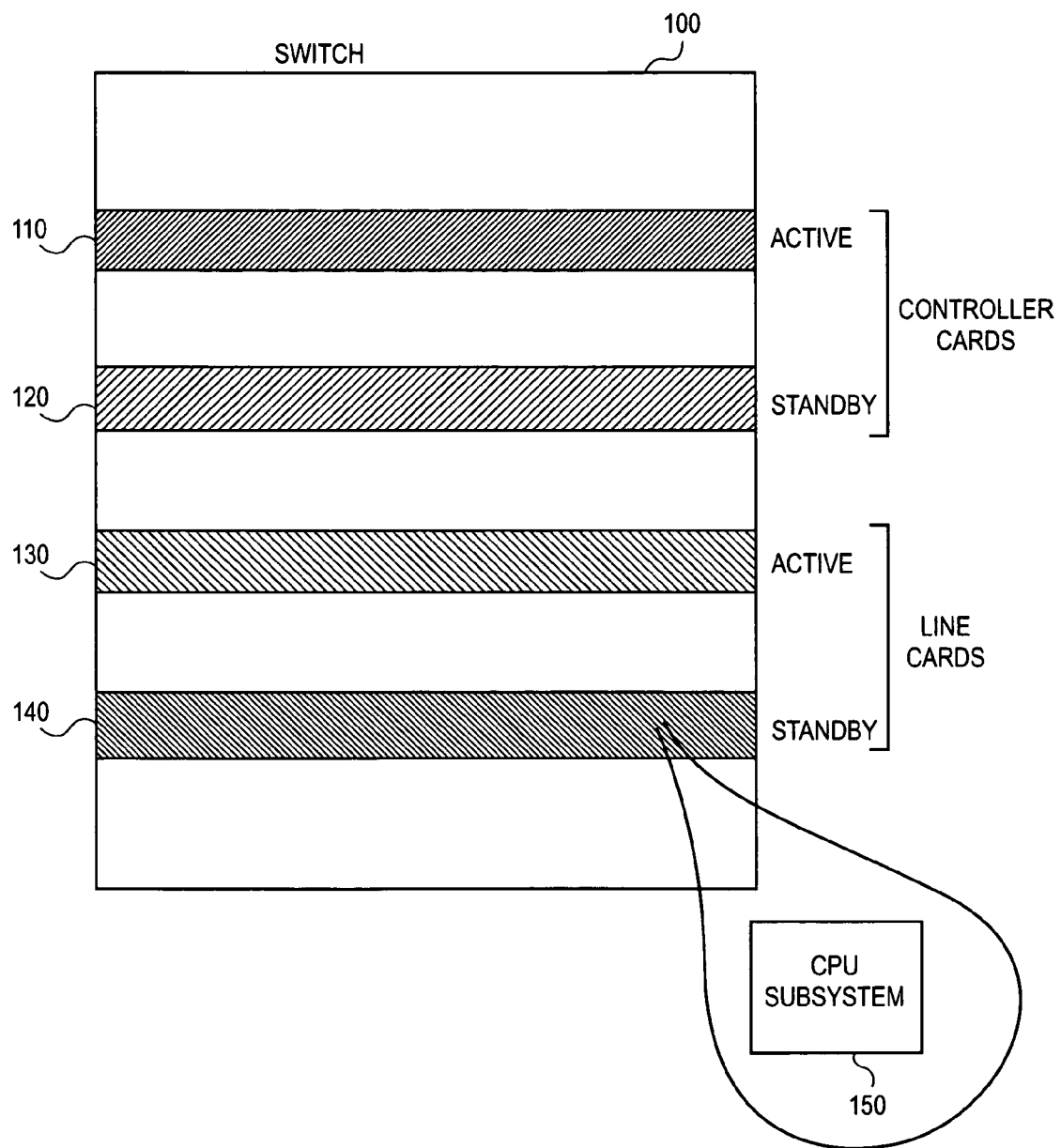
FIG. 1 shows a wide area switch for data communications such as asynchronous transfer mode (ATM) packets and Internet Protocol ("IP") data packets.

FIG. 1 shows a wide area switch for data communications such as asynchronous transfer mode (ATM) packets and Internet Protocol ("IP") data packets. For example, the switch may be a switch similar to those manufactured by Cisco Technology, Inc. of San Jose, Calif. Switch 100 can hold numerous modular cards 110–140 and includes controller cards 110 and 120. Specifically, the controller cards 110 and 120 coordinate switchwide operations such as the sequencing of the initialization of a node. In a redundant system, controller card 110 is the active card and controller card 120 is a standby card. Controller cards 110 and 120 may be a processor switch module such as those manufactured by Cisco Technology, Inc. Also included in Switch 100 are line cards 130 and 140. Again in a redundant system, line card 130 is the active card and line card 140 is the standby card. Line cards 130 and 140 may be an ATM switching module, such as those manufactured by Cisco Technology, Inc, or similar switch manufacturers. As shown in the blowup of FIG. 1, each card 110–140 contains a CPU subsystem 150. CPU subsystem 150 will be described in detail below.

Figure 2:
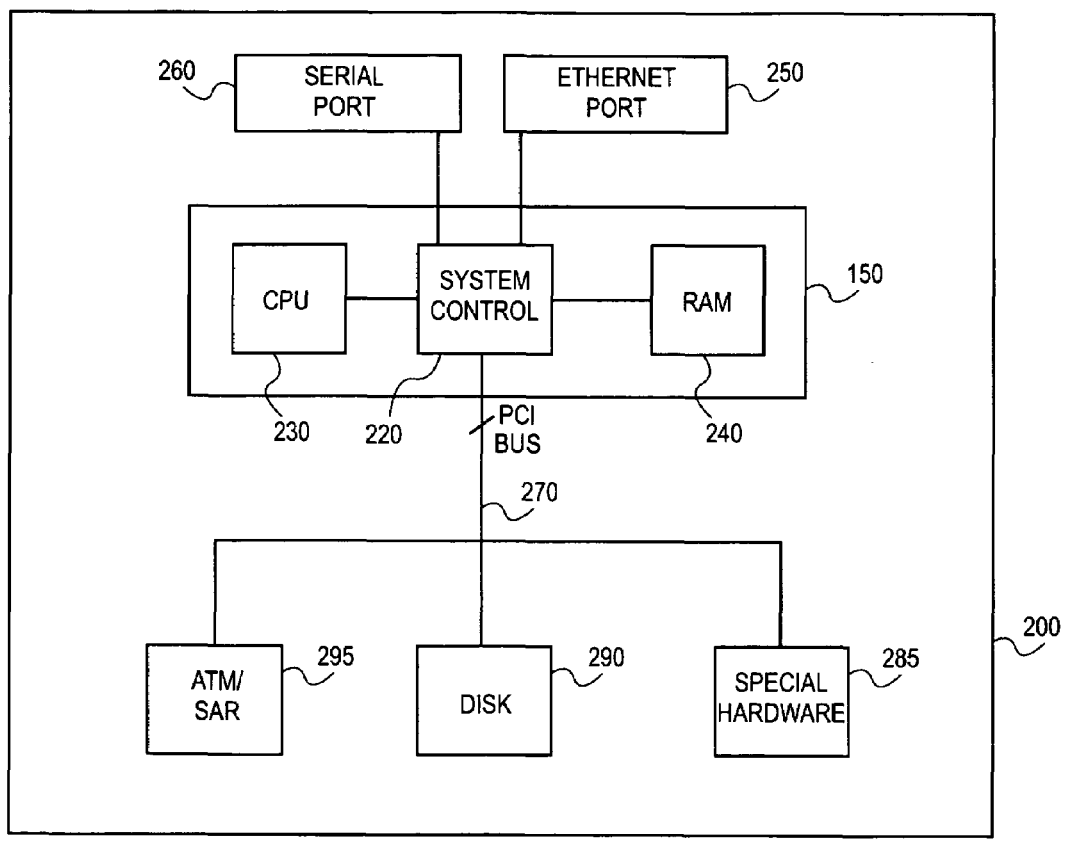
FIG. 2 shows a generic block diagram of modular card such as a controller card and line card.

Although switch 100 only shows four cards, numerous cards may be implemented of various types. FIG. 2 shows a generic block diagram of modular card such as controller cards 110 and 120 and line cards 130 and 140. Card 200 includes a CPU subsystem 150. Within CPU subsystem 150 is a system controller 220, which interfaces with random access memory 240 and PCI bus 270. Also within CPU subsystem 150 is central processing unit (CPU) 230. CPU 230 may be a MIPS™ microprocessor sold by MIPS Technologies, Inc. of Mountain View, Calif. For alternate embodiments, CPU 230 may be another type of processor.

Although embodiments of the present invention are described as having both software and hardware elements, alternative embodiments may be all hardware, all software, or a combination of each. The software implementing the present invention can be stored in RAM 240, a mass storage device available through disk interface 290, or other storage medium accessible to CPU 230. This software may also be resident on an article of manufacture comprising a computer usable mass storage medium or propagated digital signal having computer readable program code embodied therein and being readable by the mass storage medium and for causing CPU 230 to control tasks on networking cards in accordance with the teachings herein.

System controller 220 also interfaces with Ethernet port 250 for communications with a local area network (LAN) as well as serial port 260. Card 200 also includes an ATM segmentation and reassembly device (SAR) 295 as well as special hardware 285. Special hardware 285 may include a line terminator if the card 200 is a line card, or the special hardware 285 may include switching fabric if the card 200 is a processor switching module. ATM/SAR 295, Disk interface 290, and special hardware 285 are all connected to the system controller 220 via PCI bus 270.

Figure 3:
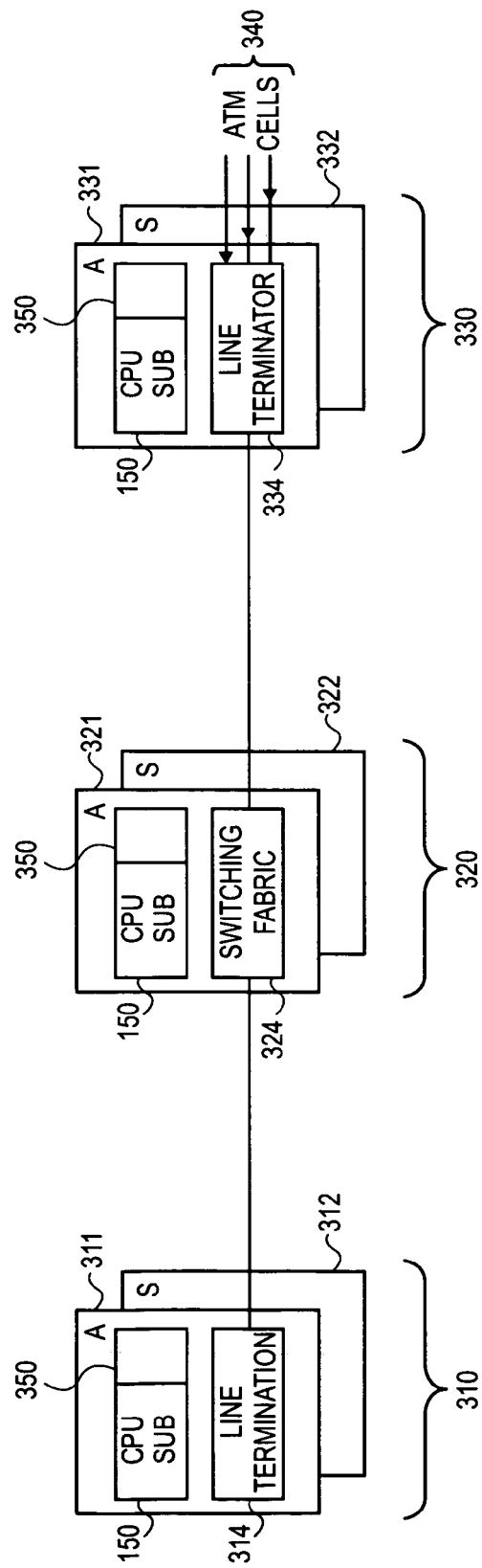
FIG. 3 shows a block diagram of redundant network cards communicating.

FIG. 3 shows a block diagram of redundant network cards communicating. Network Cards 310 are line cards with an active line card 311 and standby line card 312. Network cards 310 include CPU subsystems 150, as well as, line terminations 314.

Network cards 320 are switching cards with an active line card 321 and standby line card 322. Network cards 320 include CPU subsystems 150, as well as, switching fabric 324. Switching fabric 324 may be an Application Specific Integrated Circuit (ASIC)-based high-performance traffic switching module. Network cards 330 are also line cards and share similar physical characteristics as network cards 310. However, network cards 330 receive digital data packets. The digital data packets may be ATM cells 340 or similar user traffic. User traffic travels from the line cards 330, through switching card 320 to another set of line cards 310.

Network cards 310, 320 and 330 include Application Life Cycle State Machines 350. State machines 350 control the state of a network card, as well as, the operation of each application performed on a network card. For example, while the application is initially brought up, when active-standby switchovers occur, and when software is upgraded on network cards. State machines 350 also set rules for an application's behavior while the application is in a given state. In addition state machines 350 message errors and faults that occur during the operation of network cards. Upon discovering problems in an application, state machines 350 perform error recovery actions, which may include executing a card restart.

Figure 4:
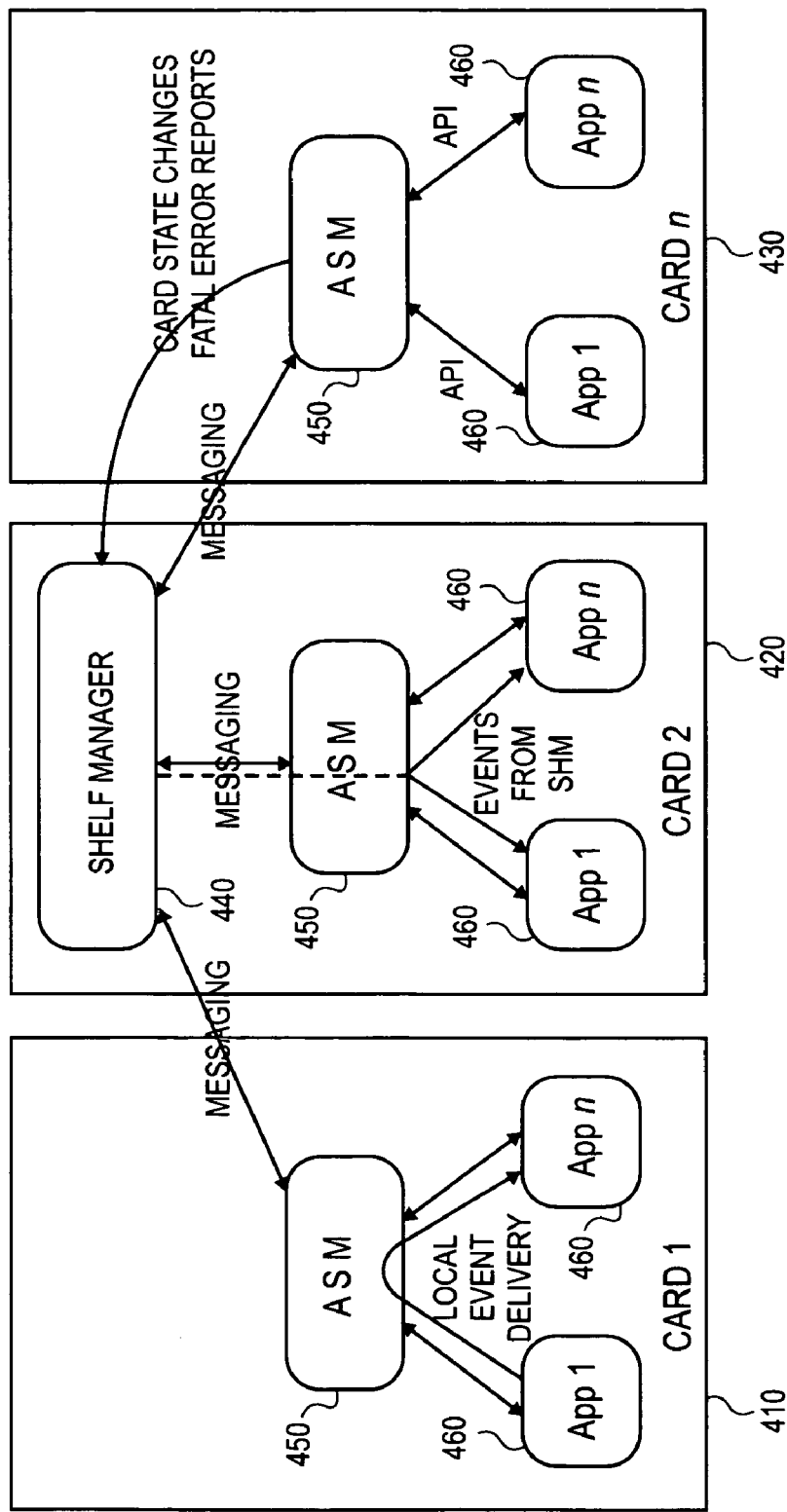
FIG. 4 shows the relationship between applications, state machines, and shelf managers.

FIG. 4 shows the relationship between applications, state machines, and shelf managers. The shelf manager 440 resides on network card 2 420. Application State Machines (ASMs) 450 reside on each network card 410, 420, and 430. Applications 460 are running on each card. An application is a set of code that implements a certain portion of the overall card functionality. An application can have one or more tasks. Examples of applications are the private network-to-network interface (PNNI) and call control, Connection Provisioning (CPRO) and Card Equipment Management Application (CEMA). FIG. 4 shows ASM 450 communicating with shelf manager 440 via a messaging protocol. ASM 450 communicates with application 460 using a functional Application Program Interface (API).

The shelf manager 440 provides events to the ASM 450, which then translates some of the card events into finer grained events for execution by the applications 460. An event is a notification to applications 460 of a significant shelf-level or card-level change. Events may notify an application 460 of local or remote card role or state changes, or card-level resource congestion, for example, ASM 450 provides an API to local applications 460 to generate events destined for other applications on the same card. ASM 450 handles delivery of events coming from both the shelf manager 440 and the local applications 460.

ASM 450 is responsible for bringing the card up from the Initialization state to the Read state. In an initialization state, only the ASM 450 is running with life support-information tasks, such as, a task monitor. In a ready state, the entire card with all its applications are operational.

Figure 5:
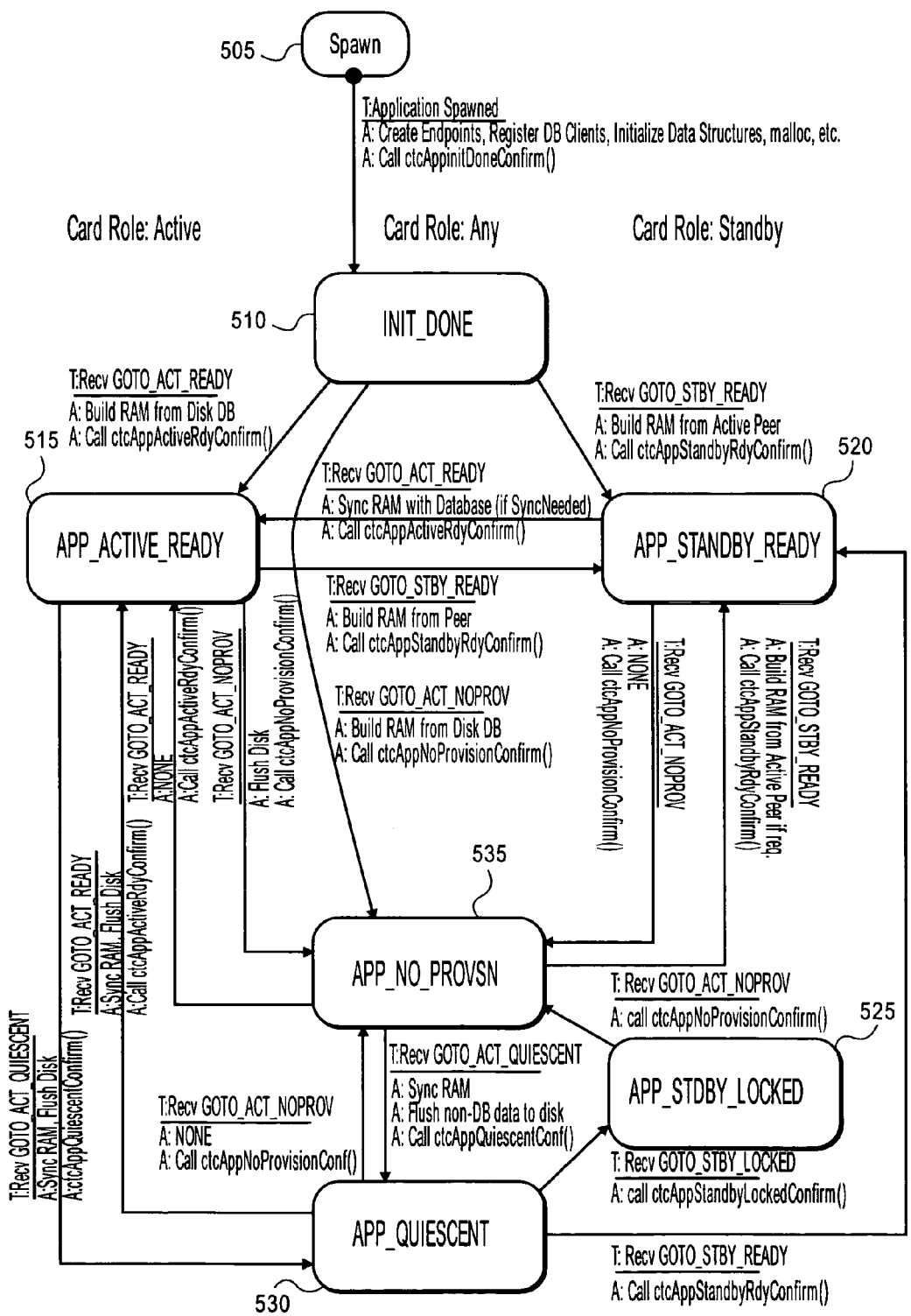
FIG. 5 shows a generic application state transition diagram.

FIG. 5 shows a generic application state transition diagram. The application is spawned in block 505. Each application is started when ASM 450 spawns application root tasks. The application is responsible for spawning all its other tasks. During initialization many operations are performed. For example, endpoints are created, database clients are registered and data structures are initialized. After these various operations are completed, the application's state transitions to INIT_DONE 510.

From the INIT_DONE 510 state, the application may enter APP_ACTIVE_READY state 515. By entering the state of block 515, the application is ready on an active network card. When transitioning from INIT_DONE 510 to APP_ACTIVE_READY 515, random access memory (RAM) is loaded with all necessary commands to execute the application from a disk database. Also during the transition a confirmation request is made to determine if the APP_ACTIVE_READY state 515 has been reached. Also from the INIT_DONE state 510, the application may enter an APP_STANDBY_READY state 520. By entering state 520, the application is on standby, on a standby network card. When transitioning from INIT_DONE state 510 to APP_STANDBY_READY state 520, RAM is loaded with all necessary commands to execute the application from the Active Network card. Also during the transition, a confirmation request is made to determine if the APP_STANDBY_READY state 520 has been reached.

Also from the INIT_DONE state 510, the application may enter an APP_NO_PROVSN state 535. By entering state 535, the application is in a no provisioning state in which it rejects all simple network management protocol (SNMP) set requests, as well as, command line interface (CLI) set requests. The application can still process SNMP get request. NO_PRVSN state 535 may be used during Upgrade/Downgrade procedures, during configuring Upload and graceful switchovers, while in state 535, the application is prevented from writing to the disk database. While in state 535 RAM may be read or written to, however some disk access is limited to read operations only. For example, configuration database disk access is limited to read operations only. But, disk write access is allowed for non-configuration disk access operations, such as statistic collection. When transitioning from INIT_DONE 510 to NO_PROVSN 535, RAM is built from the disk database. Also during the transition, a confirmation request is made to determine if the APP_NO_PROVSN state 535 has been reached. When in the APP_NO_PROVSN 335 state, the network card is in an active state.

An application can transition from APP_STANDBY_READY 520 to APP_ACTIVE_READY 515. When transitioning, the RAM is synchronized with the disk database, if needed. A confirmation request is also made. The network card may go from standby to active. Likewise, APP_ACTIVE_READY, state 515 may transition to APP_STANDBY_READY state 520. However, the RAM is built from the standby network card. Similarly, a confirmation request is made.

Both APP_ACTIVE_READY 515, and APP_STANDBY_READY 520 may transition to and from APP_NO_PROVSN 535. Transitioning from state 520 to state 535 involves a confirmation request that the APP_NO_PROVSN state 535 has been reached. Transitioning from state 515 to state 535 involves flushing the disk and then confirming the state change. Transitioning from APP_NO_PROVSN 535 to APP_ACTIVE_READY 515 involves a confirmation request. However, transitioning from state 535 to APP_

STANDBY_READY 520 involves building RAM from the active network card if required, as well, as, a confirmation request.

Another state may be attained from APP_ACTIVE_READY 515, that is APP_QUIESCENT 530. Transitioning from APP_ACTIVE_READY 515 to APP_QUIESCENT 530 involves synchronizing RAM with the standby card, as well as flushing the data to the disk. A confirmation of the state transition also occurs. APP_QUIESCENT 530 is a quiescent state in which an application is being prepared for a graceful switchover. While in the quiescent state, the application does not make changes to its RAM databases and its internal state. An application's internal state that is resynchronized with a standby peer application may include communication endpoint queues, RAM, and/or disk databases or Battery Random Access Memory (BRAM) content-Applications do process ASM 450 events while in APP_QUIESCENT 530. An application can be ineligible for entering the quiescent state. Furthermore, an application can include parameters that limit the amount of time the application is in the APP_QUIESCENT state 530. Applications may receive requests that result in RAM database changes while in the APP_QUIESCENT state 530. Both RAM and disk access is read-only in the quiescent state. The application may transition back from state 530 to APP_ACTIVE_READY state 515. This transition involves a confirmation of the change to state 515.

The application may also transition to state 530 from APP_NO_PROVSN state 535. This transition involves synchronizing the RAM of the active and standby applications. All non-database data is flushed to the disk. A confirmation of the state transition is also made. When transitioning from state 530 to state 535, neither synchronization nor flushing are required. However, a confirmation of the state transition occurs.

The APP_QUIESCENT state 530 may also transition to APP_STANDBY_READY 520. A confirmation occurs. However, APP_STANDBY_READY 520 does not transition back to APP_QUIESCENT state 530. This transition changes the state of the application from active to standby.

Another transition may occur from APP_QUIESCENT state 530 to APP_STANDBY_LOCKED 525. A confirmation is performed. The standby locked state 525 places applications in a ready state, but the application does not contact the active peer application, nor does it integrate any data from active peer application. The internal databases are locked in this state. This state may be used during upgrade/downgrade procedures. There is read-only RAM access and disk access.

The only transition made from APP_STANDBY_LOCKED state 525 is to APP_NO_PROVSN state 535. The transition involves a confirmation request and the application returns to an active state.

Figure 6B:
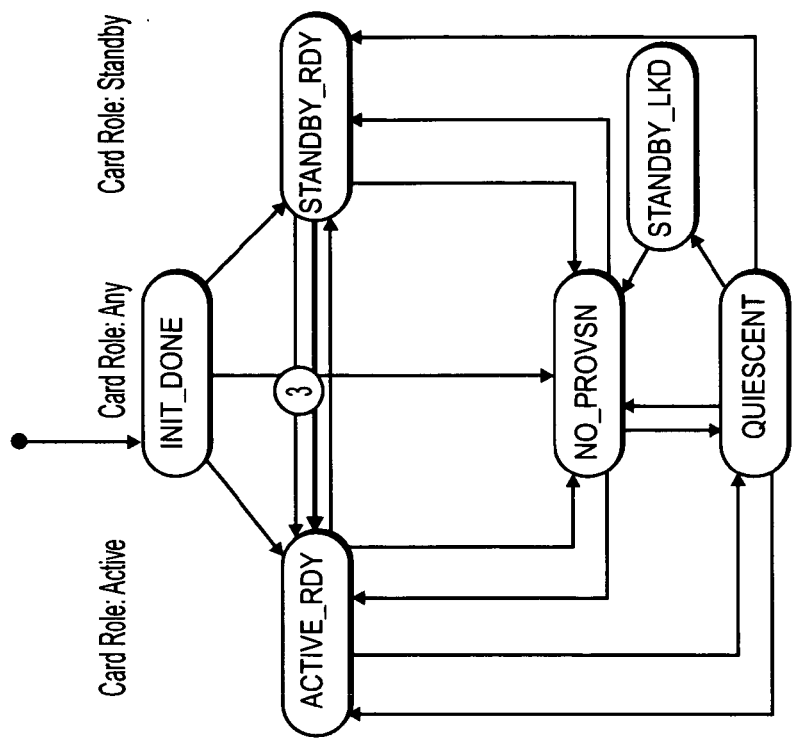
FIG. 6B shows a standby to active graceful switchover.
Figure 6A:
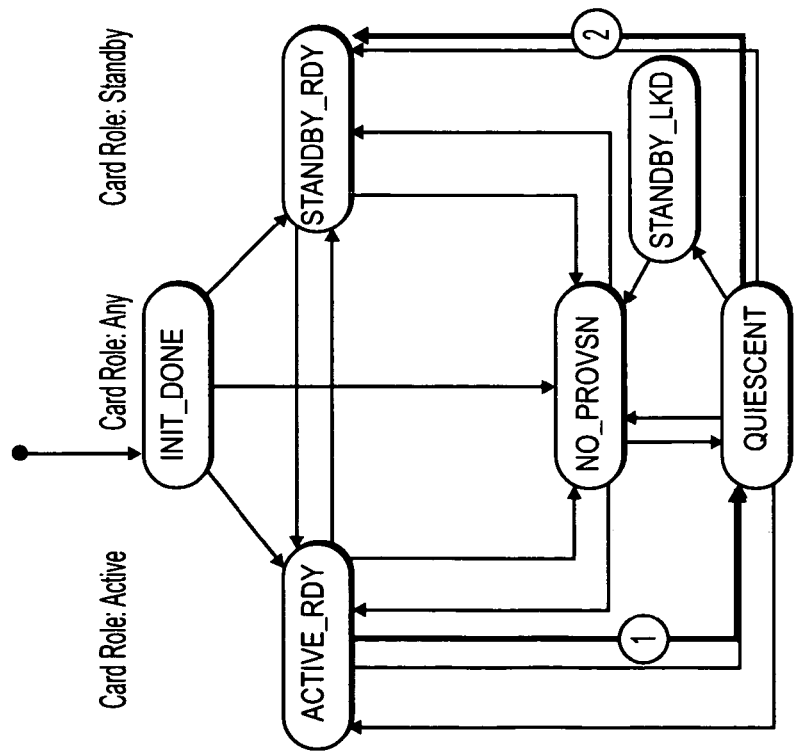
FIG. 6A shows an active to standby graceful switchover.

FIGS. 6A–6D shows examples of state transitions during graceful and upgrade switchovers. FIG. 6A shows an active to standby graceful switchover. Applications on the active card transition through 1 to the quiescent state. From the quiescent state, the active applications transition through 2 to the APP_STANDBY_RDY state. FIG. 6B shows a standby to active graceful switchover. Applications on the standby card transition through 3 to the active ready state.

Figure 6D:
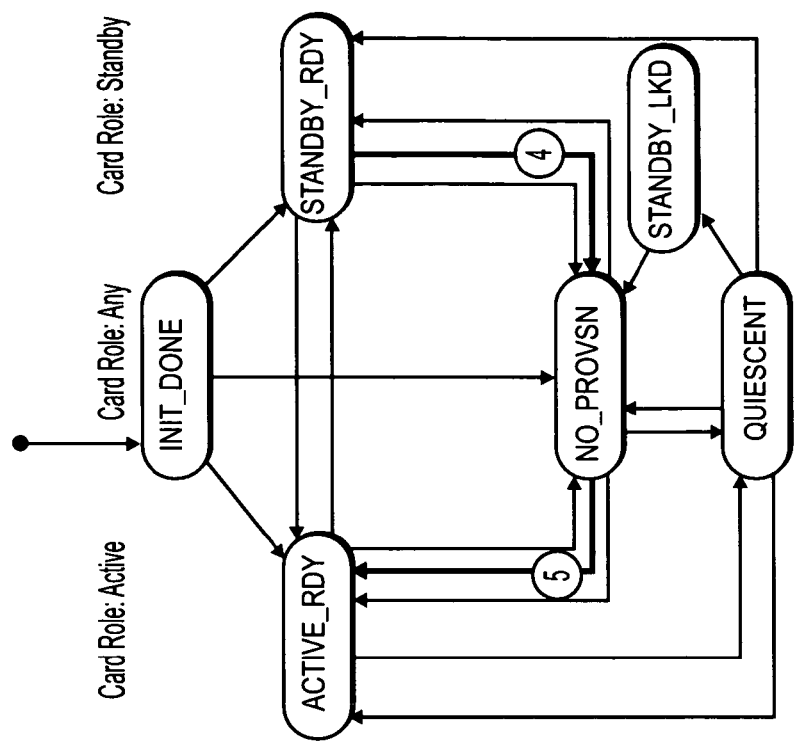
FIG. 6D shows a standby to active upgrade switchover.
Figure 6C:
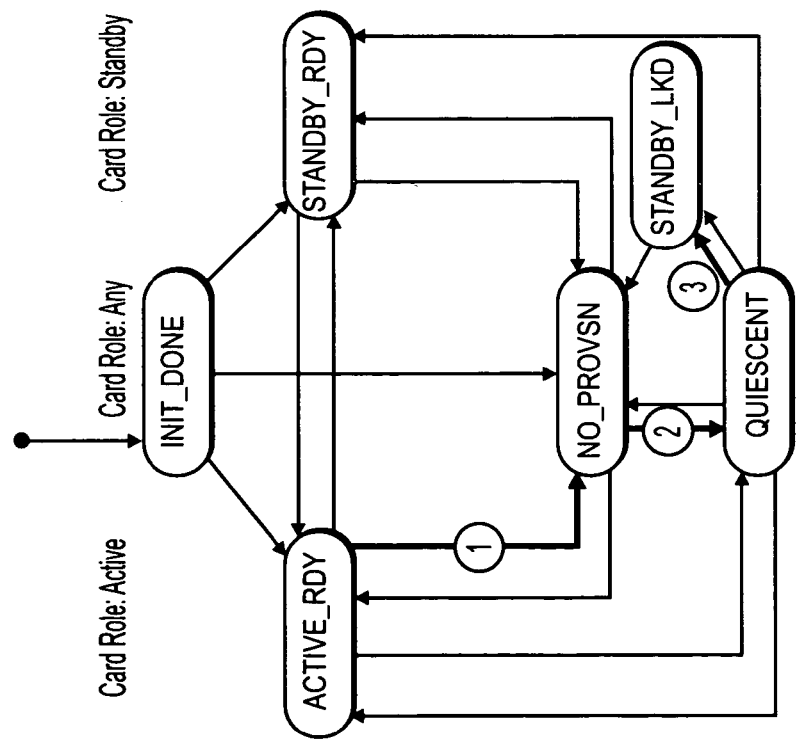
FIG. 6C shows an active to standby upgrade switchover.

FIG. 6C shows an active to standby upgrade switchover. Applications on the active card transition through 1 to the no provisioning state. From the no provisioning state, applications transition thought 2 to the quiescent state. From the quiescent state, applications transition through 3 to the standby locked state at which point the applications have transitioned to STANDBY.

FIG. 6D shows a standby to active upgrade switchover. Applications on the standby card transition through 4 to the no provisioning state. From the no provisioning state applications transition to the active ready state. Alternate embodiments may include different state transitions. During graceful transitions from the active state to the standby state, the application is not restarted, but rather gracefully transitioned through a quiescent state to the standby state.

During a software upgrade, the application transitions from the active state into a locked state where it "hibernates" until the operator determines that the newly active, higher revision application behaves properly. The locked state eliminates rebuilds (and long outages) if a new-version application fails.

During a software upgrade, the application state machine (ASM) is fault-tolerant while in transition between releases of the software. Failure on the active revision causes a switchover to the inactive revision of the software when the inactive revision is either locked or ready, depending on where the software finds itself.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawing are, accordingly, to be regarded in an illustrative rather than a restrictive manner.

We claim:

1. In a digital communications network having network cards, a method comprising:

controlling applications executed within the network, wherein controlling the applications comprises, in response to a state change message, performing a set of transitioning actions to transition each of the applications between one of a plurality of active states on an active card of the network cards and one of a plurality of standby states on a standby card of the network cards, wherein the plurality of active states comprises an active ready state, a quiescent state, and a no-provisioning state, the set of transitioning actions including:

flushing data to a disk, synchronizing RAM with a disk database, synchronizing RAM with the standby card, and building RAM from the active card, wherein all necessary commands required by each of the applications are loaded into a memory of the active card for executing each of the applications during the active ready sate, wherein memories of the active card and the standby card are synchronized during the quiescent state, and wherein at least a portion of network management requests for configuring the active network card are rejected during the no-provisioning state; and subsequent to the transitioning, sending a state change confirmation message.

2. The method of claim 1, wherein an application state machine controls the execution of the application.

3. The method of claim 2, further comprising:
receiving control messages from a shelf manager; and
communicating via APIs to the application, wherein the shelf manager may be located on a remote network card.

4. The method of claim 1, wherein the standby states comprises a standby locked state.

5. In a digital communications network having network cards,
a method comprising:
switching the state of an application in an active state to a standby state,
comprising,
in response to a first state change message, performing a set of transitioning actions to transition the application from the active state to a quiescent state on an active card of the network cards, the transitioning actions including,
flushing data to a disk, and
synchronizing RAM with the standby card;
subsequent to the transitioning from the active state to the quiescent state, sending a first state change confirmation message;
in response to a second state change message, transitioning the application from the quiescent state to the standby state on a standby card of the network cards; and
subsequent to the transitioning from the quiescent state to the standby state, sending a second state change confirmation message;
wherein all necessary commands required by each of the applications are loaded into a memory of the active card for executing each of the applications during the active state,
wherein memories of the active card and the standby card are synchronized during the quiescent state, and
wherein at least a portion of the commands required by each of the applications are loaded into a memory of the standby card for executing each of the applications during the standby state.

6. In a digital communications network having network cards,
a method comprising:
upgrading code of an application in an active state on an active card of the network cards to a standby locked state on a standby card of the network cards comprising,
in response to a first state change message, performing a first set of transitioning actions to transition the application from the active state to a no provisioning state, the first set of transitioning actions including,
flushing data to a disk,
wherein at least a portion of network management requests for configuring the active network care are rejected during the no provisioning state;
subsequent to the transitioning from the active state to the no provisioning state, sending a first state change confirmation message;
in response to a second state change message, performing a second set of transitioning actions to transition the application from the no provisioning state to a quiescent state, the second set of transitioning actions including,
synchronizing RAM with the standby card, and
flushing data to a disk,
wherein memories of the active card and the standby card are synchronized during the quiescent state;
subsequent to the transitioning from the no provisioning state to the quiescent state, sending a second state change confirmation message;
in response to a third state change message, transitioning the application from the quiescent state to the standby locked state, wherein the application is in a ready state in the standby card but does not communicate with the corresponding application of the active card; and
subsequent to the transitioning from the quiescent state to the standby locked sate, sending a third state change confirmation message.

7. The method of claim 6, wherein the standby locked state does not allow disk database access nor access to write to RAM.

8. The method of claim 6, wherein the no provisioning state does not allow access to write to a disk database.

9. The method of claim 6, wherein the quiescent state does not allow access to write to a disk database nor access to write to RAM.

10. The method of claim 6,
further comprising:
upgrading code of the application in the standby state to the active state comprising,
in response to a fourth state change message, transitioning the application from the standby state on a standby card of the network cards to a no provisioning state on an active card of the network cards;
subsequent to the transitioning from the standby state to the no provisioning state, sending a fourth state change confirmation message;
in response to a fifth state change message, transitioning the application from the no provisioning state to the active state wherein all necessary commands required by each of the applications are loaded into a memory of the active card for executing each of the applications during the active state, and wherein at least a portion of network management requests for configuring the active network card are rejected during the no provisioning state; and
subsequent to the transitioning from the no provisioning state to the active state sending a fifth state change confirmation message.

11. In a digital communications network having network cards, a system comprising:
means for controlling applications executed within the network, wherein the means for controlling the applications comprises,
means for performing a set of transitioning actions, in response to a state change message, to transition each of the applications between one of a plurality of active states on an active card of the network cards and one of a plurality of standby states on a standby card of the network cards, wherein the plurality of active states comprise an active ready state, a quiescent state, and a no-provisioning state, the set of transitioning actions including,
flushing data to a disk,
synchronizing RAM with a disk database,
synchronizing RAM with the standby card, and
building RAM from the active card,
wherein all necessary commands required by each of the applications are loaded into a memory of the active card for executing each of the applications during the active ready state,
wherein memories of the active card and the standby card are synchronized during the quiescent state, and
wherein at least a portion of network management requests for configuring the active network card are rejected ruing the no-provisioning state; and
means for sending, subsequent to the transitioning, a state change confirmation message.

12. The system of claim 11, further comprising:
means for receiving control messages from a shelf manager; and
means for communicating via APIs to the application, wherein the shelf manager may be located on a remote network card.

13. In a digital communications network having network cards, a system comprising:
means for switching the state of an application in an active state to a standby state,
comprising,
means for performing a first set of transitioning actions, in response to a first state change message, to transition the application from the active state to a quiescent state on an active card of the network cards, the first set of transitioning actions including,
flushing data to a disk, and
synchronizing RAM with the standby card;
means for sending, subsequent to the transitioning from the active state to the quiescent state, a first state change confirmation message;
means for transitioning, in response to a second state change message, the application from the quiescent state to the standby state on a standby card of the network cards; and
means for sending, subsequent to the transitioning from the quiescent state to the standby state, a second state change confirmation message;
wherein all necessary commands required by each of the applications are loaded into a memory of the active card for executing each of the applications during the active state,
wherein memories of the active card and the standby card are synchronized during the quiescent state, and
wherein at least a portion of the commands required by each of the applications are loaded into a memory of the standby card for executing each of the applications during the standby state.

14. In a digital communications network having network cards,
a system comprising:
means for upgrading code of an application in an active state on an active card of the network cards to a standby locked state on a standby card of the network cards comprising,
means for performing a first set of transitioning actions, in response to a first state change message, to transition the application from the active state to a no provisioning state, the first set of transitioning actions including,
flushing data to a disk,
wherein at least a first portion of network management requests for configuring the active network card are rejected during the no provisioning state, and wherein at least a second portion of network management requests for reading configurations of the active card are processed during the no-provisioning state;
means for sending, subsequent to the transitioning from the active state to the no provisioning state, a first state change confirmation message;
means for performing a second set of transitioning actions, in response to the second state change message, to transition the application from the no provisioning state to a quiescent state, the second set of transitioning actions including,
synchronizing RAM with the standby card, and
flushing data to a disk,
wherein memories of the active card and the standby card are synchronized during the quiescent state;
means for sending, subsequent to the transitioning from the no provisioning state to the quiescent state, a second state change confirmation message;
means for transitioning, in response to a third state change message, the application from the quiescent state to the standby locked state, wherein an application is in a ready state in the standby card but does not communicate with the corresponding application of the active card during the standby locked state; and
means for sending, subsequent to the transitioning from the quiescent state to the standby locked state, a third state change confirmation message.

15. The, system of claim 13, further comprising:
means for upgrading code of the application in the standby state to the active state comprising,
means for transitioning, in response to a fourth state change message, the application from the standby state on the standby card to the no provisioning state on the active card;
means for sending, subsequent to the transitioning from the standby state to the no provisioning state, a fourth state change confirmation message;
means for transitioning, in response to a fifth state change message, the application from the no provisioning state to the active state, wherein all necessary commands required by each of the applications are loaded into a memory of the active card for executing each of the applications during the active state, and wherein at least a portion of network management requests for configuring the active network card are rejected during the no provisioning state; and
means for sending subsequent to the transitioning from the no provisioning state to the active state, a fifth state change confirmation message.

16. A computer readable storage medium having stored thereon a plurality of instructions for controlling tasks performed on network cards, said plurality of instructions when executed by a computer, cause said computer to perform:
controlling applications executed within the network, wherein controlling the applications comprises,
in response to the state change message, performing a set of transitioning actions to transition each of the applications between one of a plurality of active states on an active card of the network cards and one of a plurality of standby states on a standby card of the network cards, wherein the plurality of active states comprise an active ready state, a quiescent state, and a no-provisioning state, the set of transitioning actions including,
flushing data to a disk,
synchronizing RAM with a disk database, synchronizing RAM with the standby card, and building RAM from the active card, wherein all necessary commands required by each of the applications are loaded into a memory of the active card for executing each of the applications during the active ready state, wherein memories of the active card and the standby card are synchronized during the quiescent state, and wherein at least a portion of network management requests for configuring the active network card are rejected during the no-provisioning state; and subsequent to the transitioning, sending a state change confirmation message.

17. The computer readable storage medium of claim 16 having stored thereon additional instructions, said additional instructions when executed by a computer, cause said computer to further perform:

receiving control messages from a shelf manager; and means for communicating via APIs to the application, wherein the shelf manager may be located on a remote network card.

18. A computer readable storage medium having stored thereon a plurality of instructions for controlling tasks performed on network cards, said plurality of instructions when executed by a computer, cause said computer to perform:

switching the state of an application in an active state to a standby state, comprising, in response to the first state change message, performing a set of transitioning actions to transition the application from the active state to a quiescent state on an active card of the network cards, the set of transitioning actions including, flushing data to a disk, and synchronizing RAM with the standby card;

subsequent to the transitioning from the active state to the quiescent state, sending a first state change confirmation message;

in response to a second state change message, transitioning the application from the quiescent state to the standby state on a standby card of the network cards; and subsequent to the transitioning from the quiescent state to the standby state, sending a second state change confirmation message;

wherein all necessary commands required by each of the applications are loaded into a memory of the active card for executing each of the applications during the active state, wherein memories of the active card and the standby card are synchronized during the quiescent state, and wherein at least a portion of the commands required by each of the applications are loaded into a memory of the standby card for executing each of the applications during the standby state.

19. A computer readable storage medium having stored thereon a plurality of instructions for controlling tasks performed on network cards, said plurality of instructions when executed by a computer, cause said computer to perform:

upgrading code of an application in an active state to a standby locked state comprising, in response to the first state change message, performing a first set of transitioning actions to transition the application from the active state to a no provisioning state on an active card of the network cards, the first set of transitioning actions including, flushing data to a disk, wherein at least a portion of network management requests for configuring the active network card are rejected during the no provisioning state;

subsequent to the transitioning from the active state to the no provisioning state, sending a first state change confirmation message;

in response to a second state change message, performing a second set of transitioning actions to transition the application from the no provisioning state to a quiescent state, the second set of transitioning actions including, synchronizing RAM with the standby card, and flushing data to a disk, wherein memories of the active card and the standby card are synchronized during the quiescent state;

subsequent to the transitioning from the no provisioning state to the quiescent state, sending a second state change confirmation message;

in response to a third state change message, transitioning the application from the quiescent state to the standby locked state on a standby card of the network cards, wherein an application is in a ready state in the standby card but does not communicate with the corresponding application of the active card during the standby locked state; and subsequent to the transitioning from the quiescent state to the standby locked state, sending a third state change confirmation message.

20. The computer readable storage medium of claim 19, said plurality of instructions cause said computer to further perform:

upgrading code of the application in the standby state to the active state comprising, in response to a fourth state change message, transitioning the application from the standby state on the standby card to the no provisioning state on the active card;

subsequent to the transitioning from the standby state to the no provisioning state, sending a fourth state change confirmation message;

in response to a fifth state change message, transitioning the application from the no provisioning state to the active state, wherein all necessary commands required by each of the applications are loaded into a memory of the active card for executing each of the applications during the active state, and wherein at least a portion of network management requests for configuring the active network card are rejected during the no provisioning state; and subsequent to the transitioning from the no provisioning state to the active state, sending a fifth state change confirmation message.

21. In a digital communications network, a system for controlling tasks performed on network cards comprising:

a CPU subsystem;

one or more input/output ports connected to the CPU subsystem for communicating with the network; and special hardware connected to the CPU subsystem via a bus, wherein the CPU subsystem controls applications executed within the network, wherein the applications receive a state change message, wherein the applications performing a set of transitioning actions in response to the state change message to transition from one of a plurality of active states on an active card of the network cards and one of a plurality of standby states on a standby card of the network cards, wherein the applications send a state change confirmation message subsequent to the transition actions, wherein the plurality of active states comprise an active ready state, a quiescent state, and a no-provisioning state, wherein the set of transitioning actions includes:
flushing data to a disk,
synchronizing RAM with a disk database,
synchronizing RAM with the standby card, and
building RAM from the active card,
wherein all necessary commands required by each of the applications are loaded into a memory of the active card for executing each of the applications during the active ready state,
wherein memories of the active card and the standby card are synchronized during the quiescent state, and
wherein at least a portion of network management requests for configuring the active network card are rejected during the no-provisioning state.

22. The system of claim 21 further comprising a disk database connected to the CPU subsystem via a PCI bus.

23. The system of claim 21, wherein the CPU subsystem comprises:
a central processing unit;
a system controller connected to the central processing unit;
random access memory connected to the system controller; and
an application state machine for transitioning applications between one of a plurality of active states and one of a plurality of standby states.

* * * * *